United States Patent [19]

Sharpe et al.

[11] 4,450,692
[45] May 29, 1984

[54] APPARATUS FOR MAKING FROZEN FOOD PRODUCTS

[75] Inventors: Verlos G. Sharpe; David G. Beers, both of Galesburg, Ill.

[73] Assignee: Magic Chef, Inc., Cleveland, Tenn.

[21] Appl. No.: 430,846

[22] Filed: Sep. 30, 1982

[51] Int. Cl.³ .............................................. A23G 9/00
[52] U.S. Cl. ....................................... 62/233; 62/342
[58] Field of Search .......................... 62/233, 342, 343

[56] References Cited

U.S. PATENT DOCUMENTS

| | | | |
|---|---|---|---|
| 1,116,096 | 11/1914 | Miller | 62/342 X |
| 1,898,724 | 9/1931 | Gifford | |
| 1,956,701 | 9/1930 | Smith | |
| 2,055,735 | 3/1935 | Stull et al. | |
| 2,200,273 | 11/1939 | Hamilton et al. | |
| 2,278,617 | 7/1940 | Knibb | |
| 2,284,907 | 12/1938 | Kinzey | |
| 2,446,066 | 12/1943 | Tate | |
| 2,488,668 | 2/1946 | Knibb | |
| 2,719,031 | 8/1953 | Morgan | |
| 2,746,260 | 5/1956 | Swenson | 62/233 |
| 2,849,868 | 9/1956 | Anderson | |
| 2,864,595 | 11/1950 | Yohe | |
| 3,465,540 | 1/1968 | Carpigiani | |
| 3,583,176 | 6/1971 | Gordy | |
| 3,952,534 | 4/1976 | Jacobs | |
| 3,952,538 | 4/1976 | Warlick | 62/342 |
| 3,988,902 | 11/1976 | Jacobs | |
| 4,179,221 | 12/1979 | Lucke | |
| 4,392,361 | 7/1983 | Cavalli | 62/343 |

Primary Examiner—William E. Tapolcai
Attorney, Agent, or Firm—Bacon & Thomas

[57] ABSTRACT

An apparatus for making frozen food products, particularly ice cream or the like, wherein the apparatus is interchangeable with the existing ice dispenser unit in the freezer compartment of a domestic refrigerator provided with an automatic ice maker unit, which apparatus includes a housing for containing the frozen food product mix, an auger blade disposed within the housing for stirring the mix during convection heat exchange between the mix and the interior of the freezer compartment, a drive assembly for detachably connecting either the auger blade or mix housing to the existing ice dispenser unit drive motor, and a user operated timer assembly for actuating the drive motor to operate same for a predetermined period of time in accordance with the desired consistency of the final product. A switch assembly is incorporated in the circuitry of the refrigerator for direct activation by the timer assembly for the dual purpose of operating the drive motor and placing the refrigerator compressor in continuous operation. An integral timer is preferably disposed in the switch assembly circuit for causing cyclical operation of the drive motor to prevent failure of same which might otherwise occur during its continuous operation.

18 Claims, 15 Drawing Figures

APPARATUS FOR MAKING FROZEN FOOD PRODUCTS

BACKGROUND OF THE INVENTION

1. Field of the Invention

The present invention generally involves devices for making frozen food products such as frozen desserts, including ice cream or the like. More specifically, the invention relates to an improved apparatus for making ice cream in the freezer compartment of an existing domestic refrigerator.

2. Description of the Prior Art

The procedure for making a frozen food product, particularly ice cream, is well known and generally involves providing a mix of the required food components which is stirred under heat exchange conditions until the mix freezes into the desired physical consistency for consumption.

It is known to make ice cream by a completely self-contained apparatus having its own independent refrigeration unit, with the evaporator coil being wrapped around a housing for containing and agitating the ice cream mix during heat exchange. However, integrated devices of this type are necessarily expensive and large in size, thereby precluding their use in all but substantially commercial or large scale production conditions. Examples of this type of ice cream making apparatus are disclosed by the Peck U.S. Pat. No. 1,477,279, Erickson et al U.S. Pat. No. 2,191,344, Martin U.S. Pat. No. 2,645,911, and Carpigiani U.S. Pat. No. 3,465,540.

Because of the widespread popularity of ice cream, the prior art has also recognized the desirability of providing a device through which ice cream can be economically made in a domestic environment. Such a device is generally in the form of a bucket-shaped container within which a housing for containing the ice cream mix is disposed for rotation by a motor supported at the top of the container. A dasher is also disposed within the housing for stirring the mix by the motor. Freezing of the mix is effected by placing a mixture of ice and salt in the annular space defined by the interior of the container and exterior of the housing. This type of device is desirable because it is economical and compact, but has the disadvantage of requiring the continuous replenishing of the ice and salt mixture in order to maintain adequate heat exchange between the mix and the resulting brine solution produced. An example of this type of ice cream making device is taught by the Bastian U.S. Pat. No. 2,599,021.

In order to provide for both the economic and automatic making of ice cream in a domestic environment, the prior art has therefore proposed an additional type of ice cream making device which is used in conjunction with an existing domestic refrigerator, the latter providing the required cold temperature for freezing the mix. In this way, the making of ice cream in a domestic environment could therefore be accomplished without the need of an expensive separate refrigeration unit or the tedious task of replenishing an ice and salt mixture in order to provide the necessary heat exchange conditions. An ice cream maker of this type could therefore be economically constructed into a compact unit that essentially includes a housing for containing the mix and an appropriate stirrer for agitating the mix. The stirrer is typically powered by a motor that is integrally associated with the housing, by a separate motor disposed in the refrigerator, or by the motor used to drive the main compressor of the refrigerator. However, ice cream makers of this type are characterized by certain disadvantages, a primary one being the necessity of specifically altering or retrofitting the existing refrigerator structure to accommodate the ice cream maker. For example, devices of this type having an integrally associated motor require a power connection which must be established within the freezer compartment of the refrigerator since the seal of a typical refrigerator door precludes the disposing of a power cord across the seal perimeter. When a separate motor is provided in the refrigerator for operating the device, custom retrofitting must be accomplished to permanently or temporarily support the motor in a position of use and connection to an appropriate power source. In those situations when the device is driven directly by the main compressor motor of the refrigerator, a cumbersome power takeoff must be provided, with the additional load imposed on the compressor motor detrimentally affecting normal compressor operation. Examples of different forms of this type of device for making ice cream in an existing domestic refrigerator are disclosed by the Gifford U.S. Pat. No. 1,898,724, Stull et al U.S. Pat. No. 2,055,735, Knibb U.S. Pat. No. 2,278,617, Kinzey U.S. Pat. No. 2,284,907, Knibb U.S. Pat. No. 2,488,668, Anderson U.S. Pat. No. 2,849,868, Yohe U.S. Pat. No. 2,864,595, and Gordy U.S. Pat. No. 3,583,176.

SUMMARY OF THE INVENTION

It is an object of the present invention to provide an improved apparatus for making frozen food products in a domestic environment.

It is another object of the invention to provide an improved apparatus for making ice cream in the freezer compartment of a domestic refrigerator without the need for altering or retrofitting the existing refrigerator structure.

It is a further object of the invention to provide an improved apparatus for making ice cream which is readily interchangeable with the existing ice dispenser unit of a domestic refrigerator having an automatic ice maker.

It is yet another object of the invention to provide an improved apparatus for making ice cream which is economical to manufacture, efficient in operation and is capable of making a variety of ice creams having different consistencies and compositions.

It is still a further object of the invention to provide an improved apparatus for making ice cream in the freezer compartment of a refrigerator wherein the apparatus is capable of realizing maximum convection heat exchange between the ice cream mix and cold air in the freezer compartment.

These and other objects of the invention are achieved by providing a novel apparatus for making ice cream or other frozen food products in the freezer compartment of a domestic refrigerator provided with an automatic ice maker and an associated ice dispenser unit, the latter being operated by and detachable from a stationary drive motor disposed in the freezer compartment. The apparatus includes a cylindrical housing for containing the ice cream mix which is stirred by a removable auger blade. The exterior of the housing is preferably provided with spaced circumferential fins for maximizing the exterior surface area of the housing and enhancing convection heat exchange between the mix and the cold air of the freezer compartment. The housing is removably supported on a casing which contains a drive assembly for detachably connecting the auger blade to the drive motor and a timer assembly for actuating the drive motor to operate same for a predetermined period of time that is preset by the user in accordance with the desired consistency of the final product. The drive motor is controlled through a switch assembly disposed in the circuitry of the refrigerator such that actuation of the drive motor simultaneously places the compressor of the refrigerator into continuous operation, thereby assuring the maintenance of an adequately cold temperature in the freezer compartment. It is further preferable to incorporate an integral timer in conjunction with the switch assembly to provide for cyclical operation of the drive motor during the operation of same in order to prevent damage to the drive motor which might otherwise occur during its continuous operation. This latter feature permits the use of the conventional minimum size drive motor normally associated with an ice dispenser unit, thereby obviating the need for a larger and more expensive motor in order to practice the invention.

In an alternative embodiment of the invention, the housing may be detachably connected to and driven by the drive assembly relative to a stationary auger blade.

Moreover, the housing may further be disposed so that it or its associated auger blade may be rotated by the drive assembly about either a vertical or horizontal axis.

Other objects and advantages of the present invention shall become apparent from the following description and appended claims, reference being made to the accompanying drawings forming a part of the specification wherein like reference characters designate corresponding parts in the several views.

DETAILED DESCRIPTION OF THE PREFERRED EMBODIMENTS

Figure 1:
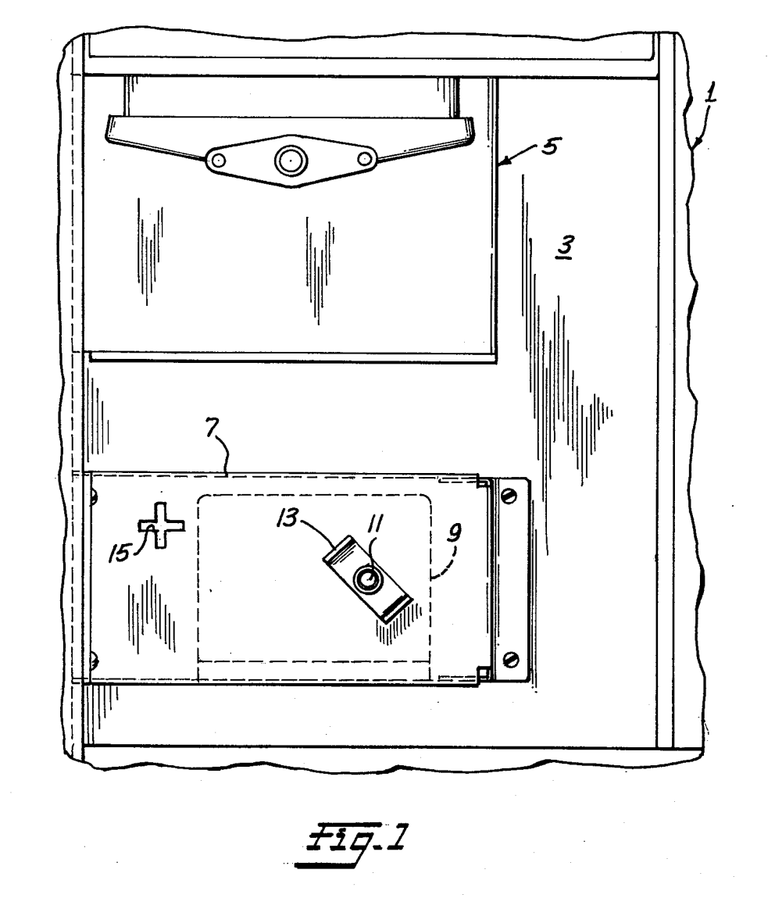
FIG. 1 is a fragmentary front elevational view of the freezer compartment of a domestic refrigerator provided with an automatic ice maker and an ice dispenser unit, with the latter unit removed and its associated drive motor housing slightly modified to accommodate interchangeability between the ice dispenser unit and the apparatus of the present invention.

As shown in FIG. 1, a domestic refrigerator, indicated generally at 1, includes a freezer compartment 3 within which frozen foods are stored for future consumption. Compartment 3 is provided with an automatic ice maker, indicated generally at 5. A housing 7 is disposed directly beneath ice maker 5 and secured adjacent the rear of compartment 3 for containing a stationary drive motor 9 that operates an ice dispenser unit (not shown) which receives and dispenses ice made by automatic ice maker 5. Motor 9 includes a drive shaft 11 having a U-shaped drive yoke 13 at its end for automatically engaging and rotating the drive shaft of the dispensing auger contained in the ice dispenser unit when the latter is placed within compartment 3 in its position of operation below automatic ice maker 5. As also shown, housing 7 includes an aperture 15 of a cross or other appropriate configuration to permit interchangeability between the ice dispenser unit and apparatus according to the invention in a manner as shall be hereinafter detailed.

Figure 2:
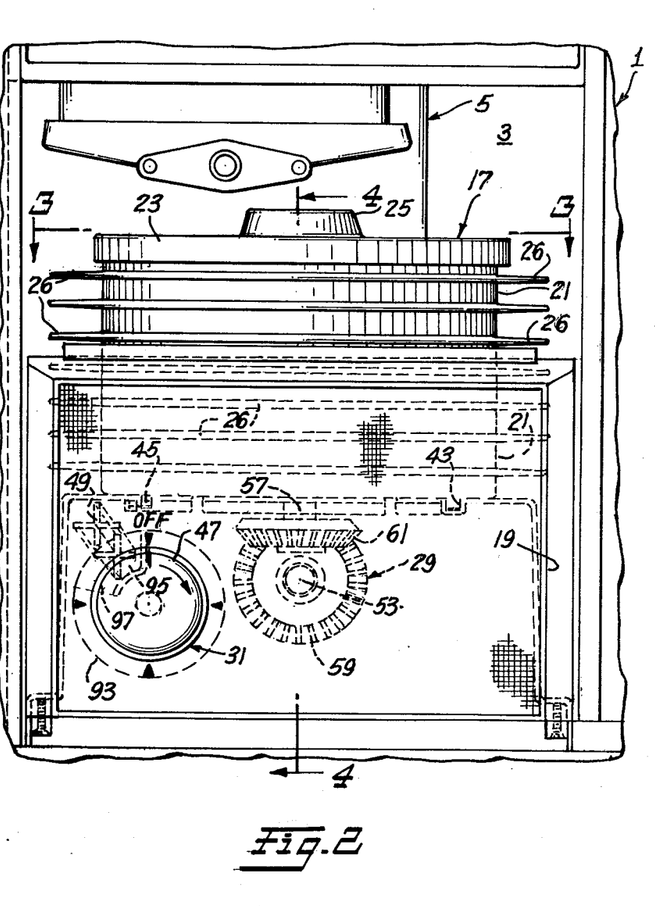
FIG. 2 is a view similar to FIG. 1, but depicting an apparatus according to a first embodiment of the invention installed in substitution for the existing ice dispenser unit.
Figure 3:
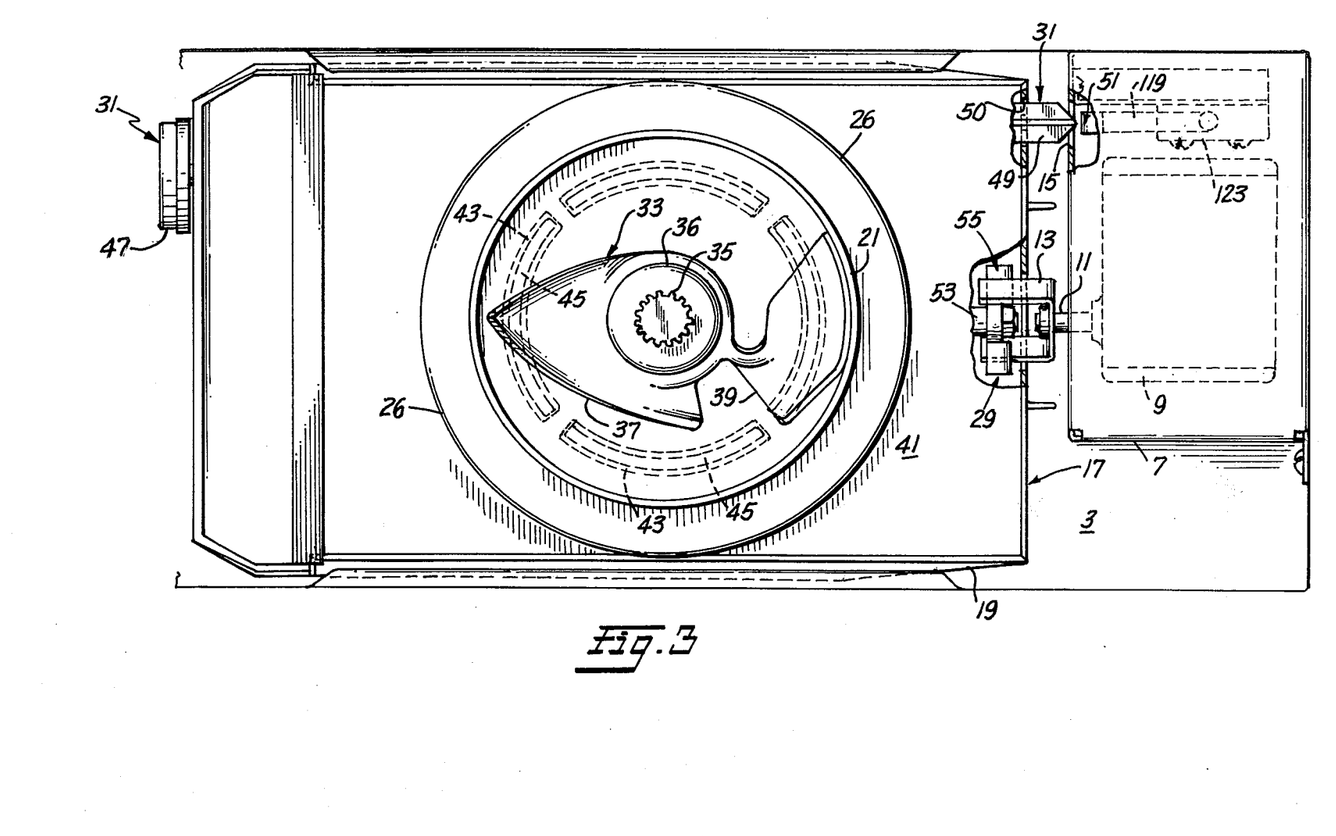
FIG. 3 is a plan view taken on the line 3—3 of FIG. 2, with portions broken away for purposes of illustration.

With reference to FIG. 2, an apparatus 17 in accordance with the invention, for making ice cream or other similar frozen food products, is shown disposed within compartment 3 below automatic ice maker 5 in substitution for the existing ice dispenser unit. Apparatus 17 is generally defined by a casing 19 on which a cylindrical housing 21 is removably supported for containing and stirring an ice cream mix or other appropriate food composition. Housing 21 is provided with a removable cap 23 at its upper end, with cap 23 also including a central handle 25 for grasping by a user. The exterior wall surface of housing 21 is preferably provided with a plurality of circumferential and spaced fins 26 to maximize the exterior surface area of housing 21 and enhance convection heat exchange between the mix contained therein and the ambient cold air in compartment 3. Disposed within casing 19 are a drive assembly 29 and a timer assembly 31, both of which shall be hereinafter described in detail. Referring to FIG. 3, housing 21 is shown with cap 23 removed. An auger blade 33 is disposed within housing 21 and secured in a position of use by means of a knurled knob 35 which attaches to the threaded end of a drive shaft (not shown). Auger blade 33 is preferably defined by a hollow central section 36, a wiping section 37 and a scraping section 39, the latter two sections serve to respectively lay and scrape the mix contained in housing 21 during rotation of blade 33 in the clockwise direction as viewed in FIG. 3. In this way, maximum and uniform convection heat exchange can be effected between the mix contained in housing 21 and the ambient cold air of compartment 3. Housing 21 may be secured in a stationary position against rotation on an upper surface 41 of casing 19 by providing surface 41 with a plurality of arcuate-shaped recesses 43 within which a plurality of correspondingly shaped ridges 45 provided on the bottom of housing 21 are received. This arrangement permits an easy alignment of housing 21 on casing 19 and, moreover, facilitates the quick removal of housing 21 from casing 19 by simply unscrewing knob 35 and lifting housing 21 to free ridges 45 from their corresponding recesses 43.

As also shown in FIG. 3, timer assembly 31 includes a timer knob 47 which is rotated by the user to preset the period of time during which apparatus 17 shall operate in accordance with the consistency desired for the final product. Rotation of knob 47 serves to reciprocate a plunger 49 through an aperture 50 provided in casing 19 and aperture 15 of housing 7, both of which apertures correspond to the cross-sectional configuration of plunger 49, which configuration is preferably of a cross or other appropriate shape. Reciprocation of plunger 49 through aperture 15 causes the actuation of a switch assembly 51, the functions and details of which shall be later described. The substitution of apparatus 17 for the existing ice dispenser unit in compartment 3 provides for an automatic driving engagement between drive yoke 13 and a horizontal drive shaft 53 of drive assembly 29. This is accomplished by providing a corresponding socket 55 at the end of drive shaft 53 for interlocking with drive yoke 13 immediately upon full insertion of apparatus 17 into compartment 3. It is also preferable that plunger 49 be partially inserted through aperture 15 upon full insertion of apparatus 17 into compartment 3, but in the absence of actuating timer knob 47, in order to provide a key alignment between plunger 49 and housing 7. The operational mode of apparatus 17 is therefore realized when, after full substitution of apparatus 17 for the existing ice dispenser unit in compartment 3 has been accomplished, the end of plunger 49 is keyed through aperture 15 and drive yoke 13 is in full interlock engagement with socket 55.

The specific details of drive assembly 29 and timer assembly 31 shall now be described with particular reference to FIGS. 4-10. With initial reference to FIGS. 4 and 8, horizontal drive shaft 53 of drive assembly 29 is drivingly connected to a vertical drive shaft 57 through a pair of right angle bevel gears 59 and 61 provided on the respective corresponding ends of drive shafts 53 and 57. Drive shaft 53 may be supported in its horizontal disposition by a pair of hangers 63 extending downwardly from the upper interior surface of casing 19. As more clearly shown in FIG. 7, each hanger 63 includes a pair of struts 65 carried by casing 19 and provided with a pair of semicylindrical-shaped clamps 67 which embrace drive shaft 53 and secure same to struts 65 by a pair of screws 68 or other similar fastening means. Vertical drive shaft 57 is journaled for rotation through a first bearing assembly 69 disposed adjacent bevel gear 61 and a second bearing assembly 71, a portion of the latter being defined by a vertical housing 73 carried by casing 19 for enclosing a major portion of drive shaft 57.

Figure 6:
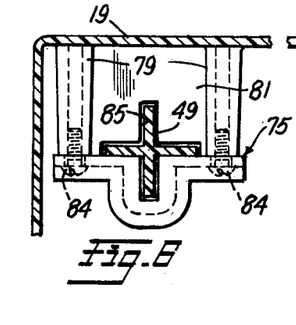
FIG. 6 is a fragmentary vertical sectional view depicting the guide for supporting the plunger of the timer assembly, taken on the line 6—6 of FIG. 4.
Figure 7:
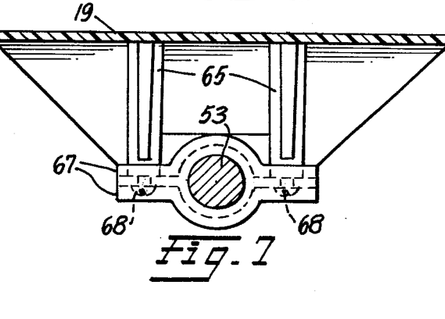
FIG. 7 is a fragmentary vertical sectional view depicting a hanger for supporting the horizontal drive shaft of the drive assembly for the auger blade, taken on the line 7—7 of FIG. 4.

Plunger 49 of timer assembly 31 is supported for reciprocating movement in a horizontal direction by means of a guide 75. A coil spring 77 or similar resilient means has its opposite ends attached to plunger 49 and guide 75 in order to bias plunger 49 towards the left portion of apparatus 17 as viewed in FIG. 4. Referring particularly to FIG. 6, guide 75 is shown to include a pair of supports 79 carried by and extending downwardly from casing 19. A bridge plate 81 connects support 79 and a clamp 83 is secured to the lower ends of support 79 by means of screws 84 or other similar fastening means. Portions of bridge plate 81 and clamp 83 are configured to collectively define an aperture 85 having the same cross-sectional configuration of plunger 49 and through aperture 85 plunger 49 may be supported for free reciprocation towards and away from switch assembly 51 contained in housing 7.

Figure 4:
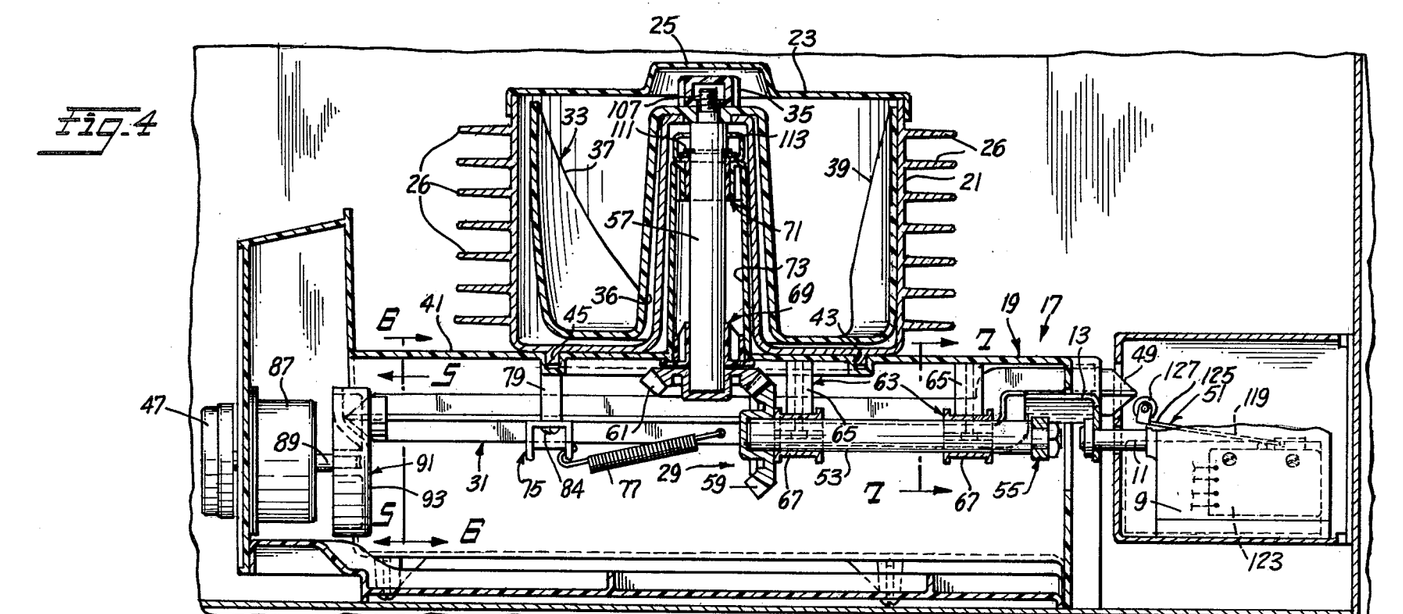
FIG. 4 is a fragmentary vertical sectional view taken on the line 4—4 of FIG. 2.
Figure 5:
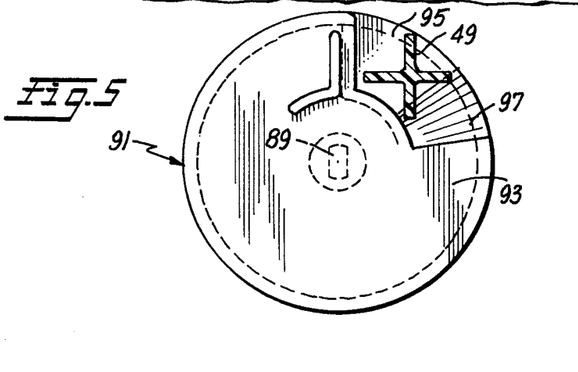
FIG. 5 is an enlarged vertical sectional view depicting the face of the cam associated with the timer assembly, taken on the line 5—5 of FIG. 4.
Figures 8, 9, 10, 11, 12:
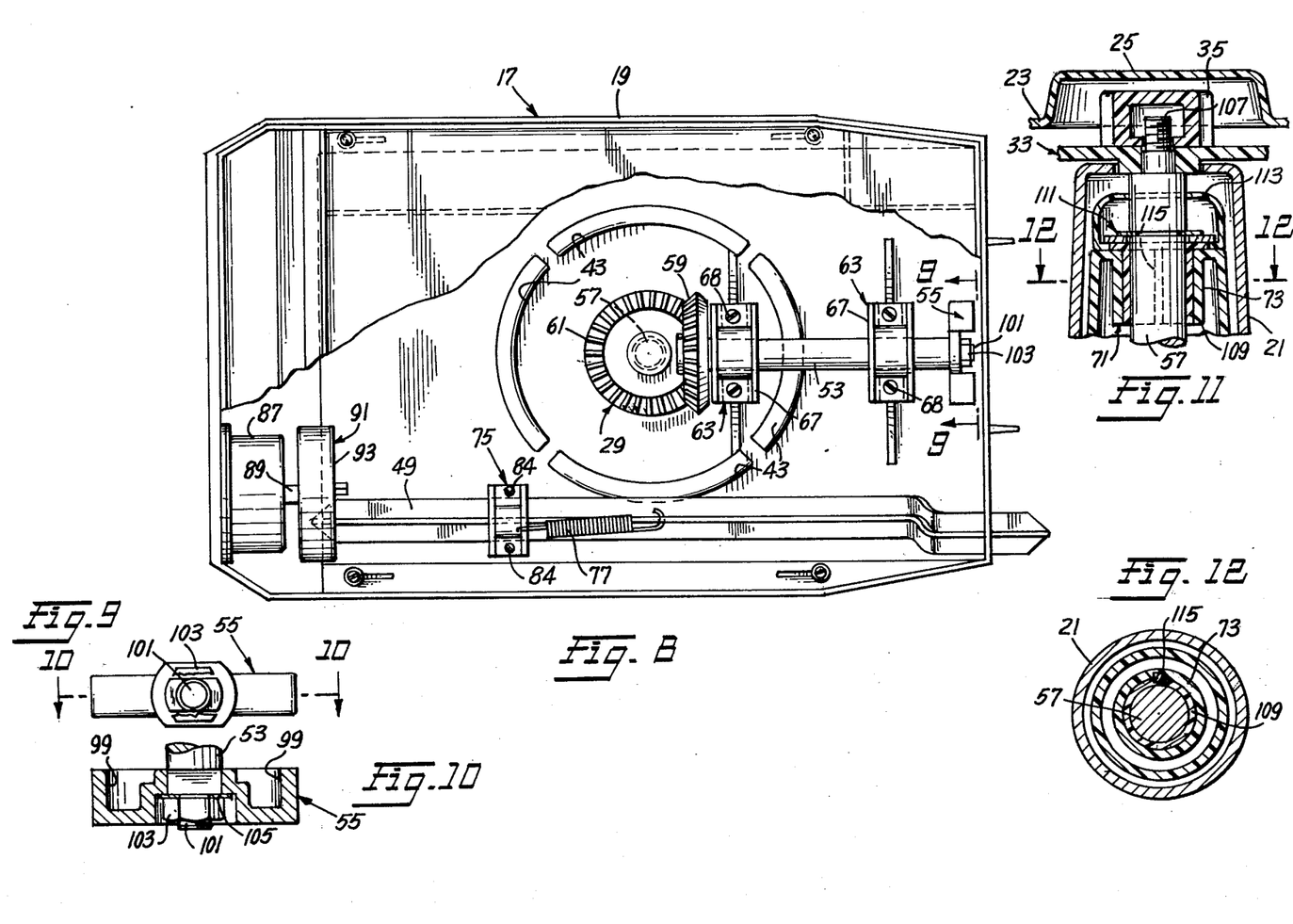
FIG. 8 is a bottom plan view of the apparatus of the invention with the bottom of the casing being partially broken away.
FIG. 9 is a view taken on the line 9—9 of FIG. 8.
FIG. 10 is a horizontal sectional view taken on the line 10—10 of FIG. 9.
FIG. 11 is an enlarged fragmentary vertical sectional view of the upper end of the vertical drive shaft of the drive assembly for the auger blade, particularly depicting the washer seal and bearing assemblies.
FIG. 12 is a horizontal sectional view taken on the line 12—12 of FIG. 8.

Referring more particularly to FIGS. 4, 5 and 8, timer knob 47 directly actuates a timing mechanism 87, the latter being of any type well known in the art and deemed suitable for the practice of the invention as disclosed herein. Timing mechanism 87 includes a drive shaft 89 which undergoes rotation during the entire period of time preset by knob 47. A cam 91 is secured to the end of drive shaft 89 for rotation therewith. As shown in FIG. 5, cam 91 is provided with a timing surface 93, a dwell recess 95 and an incline surface 97 bridging dwell recess 95 and timing surface 93. The free end of plunger 49 is continuously biased against cam 91 by the action of spring 77. In the position of cam 91 as depicted in FIG. 5, the end of plunger 49 is in contact with the bottom of dwell recess 95, which position is in the "OFF" mode of apparatus 17, with the latter being placed in a nonoperational state. When timing mechanism 87 is set through clockwise rotation of knob 47, a corresponding rotation of cam 91 is effected through rotation of drive shaft 89. It is therefore apparent that cam 91 shall rotate in the counterclockwise direction while plunger 49 remains stationary, thereby advancing incline surface 97 under the end of plunger 49 and causing a gradual reciprocation of plunger 49 towards switch assembly 51 in housing 7. Continued rotation of cam 91 eventually causes the end of plunger 49 to be located on timing surface 93, at which point switch assembly 51 is fully actuated by plunger 49. The final position of plunger 49 on timing surface 93 shall determine the period of time during which apparatus 17 is placed in its "ON" mode, with apparatus 17 being operational. Once the position of plunger 49 is set on timing surface 93, timing mechanism 87 immediately begins its countdown function and drive shaft 89 is caused to rotate in the reverse direction until plunger 49 is again placed in dwell recess 95, thereby terminating operation of apparatus 17 and placing the latter back into its "OFF" mode.

The details of socket 55 carried by the end of horizontal drive shaft 53 of drive assembly 29 shall now be described in detail with particular reference to FIGS. 9 and 10. Socket 55 is preferably of longitudinal configuration and provided with a pair of opposed recesses 99 within which are received the corresponding legs of drive yoke 13. Socket 55 may be retained on a threaded end 101 of drive shaft 53 by means of a nut 103 and washer 105.

The details of the structure and the manner in which housing 21 and auger blade 33 are removably attached to vertical drive shaft 57 shall now be described with reference to FIGS. 11 and 12. As seen therein, vertical drive shaft 57 is provided with a reduced diameter threaded end 107 onto which knurled knob 35 is attached. A bearing sleeve 109 is disposed in second bearing assembly 71, which sleeve 109 journals drive shaft 57 for rotation relative to vertical housing 73 of casing 19. An appropriate washer assembly 111 is provided to secure drive shaft 57 to second bearing assembly 71 and a cap seal 113 may be provided to enclose the upper portion of bearing assembly 71. As more particularly shown in FIG. 12, a longitudinal key 115 is disposed at the interface defined by vertical housing 73 and bearing sleeve 109 to secure these latter two components to each other against relative movement.

Figure 13:
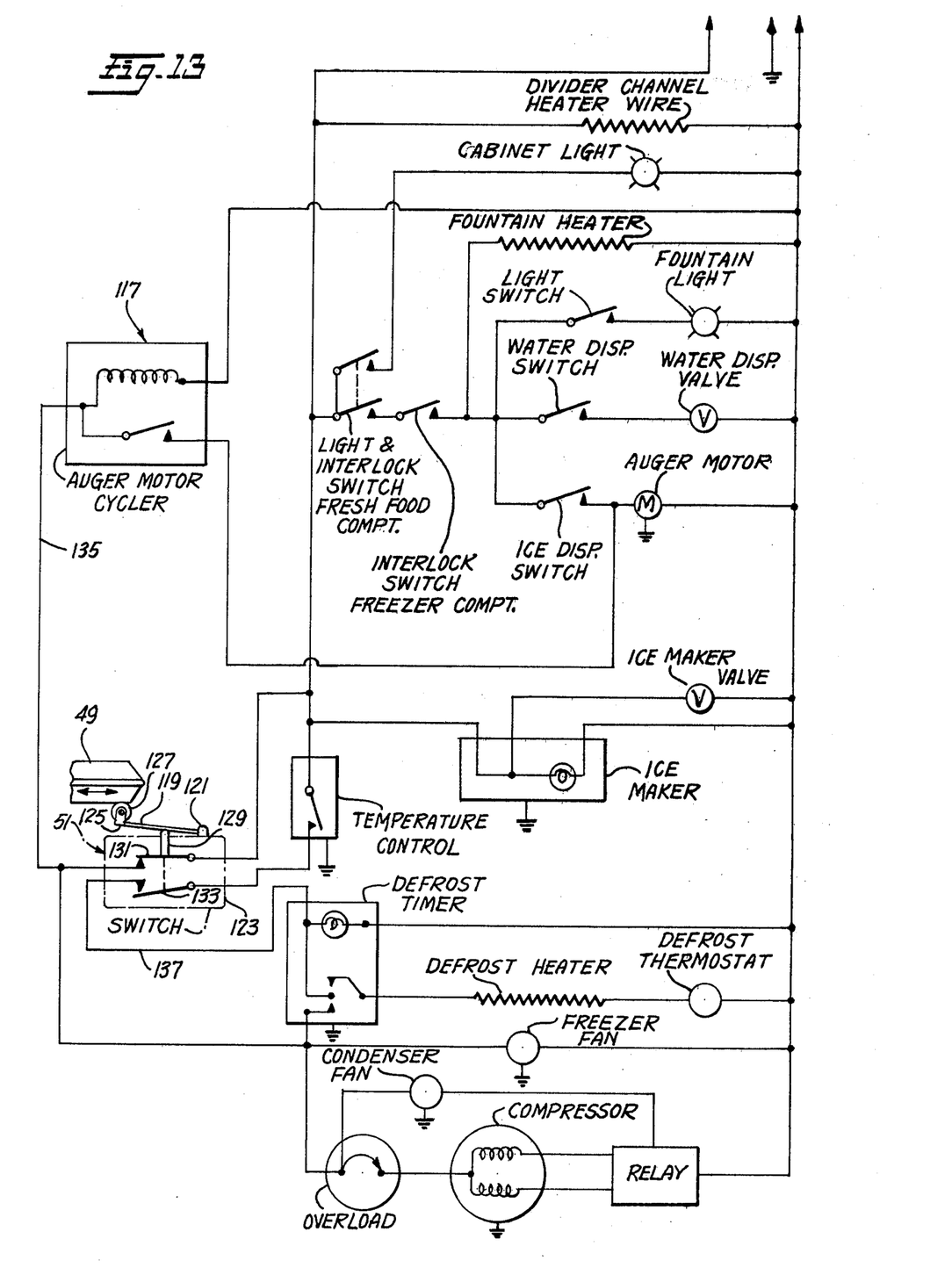
FIG. 13 is a schematic diagram of the electrical wiring circuit used in the practice of the invention.

The electrical circuitry system for the practice of the invention shall now be described with reference to the schematic circuit diagram depicted in FIG. 13. As is immediately apparent, the majority of this circuitry is conventional for a domestic refrigerator provided with an automatic ice maker, an ice dispenser unit and an automatic defrost cycle, in addition to the basic components of a standard refrigeration unit, including a compressor, a compressor motor and associated components. Referring specifically to the left hand portion of FIG. 13, it is seen that the conventional circuitry has been modified for the practice of the invention by incorporating switch assembly 51 and an integral timer 117, the latter serving to provide the aforedescribed cyclical operation of drive motor 9. Integral timer 117 may be of any type well known in the art and capable of performing the function described herein, with such device generally known in the industry as a compact cycle timer comprised essentially of a synchronous motor with a cam and switch unit.

Switch assembly 51 preferably comprises a spring arm 119 rigidly secured at an end 121 to a switch housing 123 or similar stationary support. A free end 125 of arm 119 is provided with a roller 127 for contact by plunger 49 during reciprocation of the latter. An actuating rod 129 is operatively connected to a bypass switch 131 and a normal mode switch 133. Actuation of switch assembly 51 by plunger 49 provides for alternative closing and opening of switches 131 and 133. As is apparent, in the position of plunger 49 as shown, switch 131 is in the closed position, thereby automatically placing switch 133 in the open position. Upon removal of plunger 49 from contact with roller 127, the relative positions of switches 131 and 133 will be automatically reversed, with the former switch being placed in an open position and the latter switch being placed in a closed position. Integral timer 117 is placed in circuit with bypass switch 131 through line 135, while the defrost cycle components are placed in circuit with normal mode switch 133 through line 137.

In accordance with the above circuit system, the depicted position of plunger 49 closes bypass switch 131 and correspondingly opens normal mode switch 133, thereby placing apparatus 17 in its "ON" operational mode by virtue of three basic changes in the system. First, drive motor 9 is placed into cyclical operation by integral timer 117. Second, the defrost cycle is bypassed and deactivated. Third, the compressor of the refrigerator is placed in continuous operation. To place apparatus 17 in its "OFF" nonoperational mode, plunger 49 is reciprocated away from switch assembly 51 and contact with roller 127, thereby simultaneously opening switch 131 and closing switch 133. This disposes the refrigerator circuit into its regular operational mode wherein, when the ice dispenser unit is resubstituted for apparatus 17, drive motor 9 may be manually activated by the user. Moreover, the compressor is also placed under thermostatically controlled operation and the defrost cycle circuit is reactivated for normal operation.

Though apparatus 17 has been described in a preferred embodiment wherein it may be substituted for an existing ice dispenser unit and driven by the drive motor normally used for operating the ice dispenser unit, it is entirely conceivable that the invention can be practiced in the freezer compartment of a domestic refrigerator that has not been provided with an automatic ice maker unit. In this latter instance, an appropriate drive motor shall be installed in the freezer compartment and provided with switch assembly 51 and the circuitry system depicted in FIG. 13. The purpose of integral timer 117 for placing drive motor 9 in cyclical operation is important from the standpoint that the typical drive motor as associated with an ice dispenser unit is not generally capable of withstanding the sustained continuous operation required for making ice cream. It has therefore been discovered that by causing drive motor 9 to operate on an intermittent basis through integral timer 117, not only can a high quality frozen food product be produced, but significant economic savings can be realized since only a conventional ice dispenser unit drive motor is required for the practice of this invention.

Figure 14:
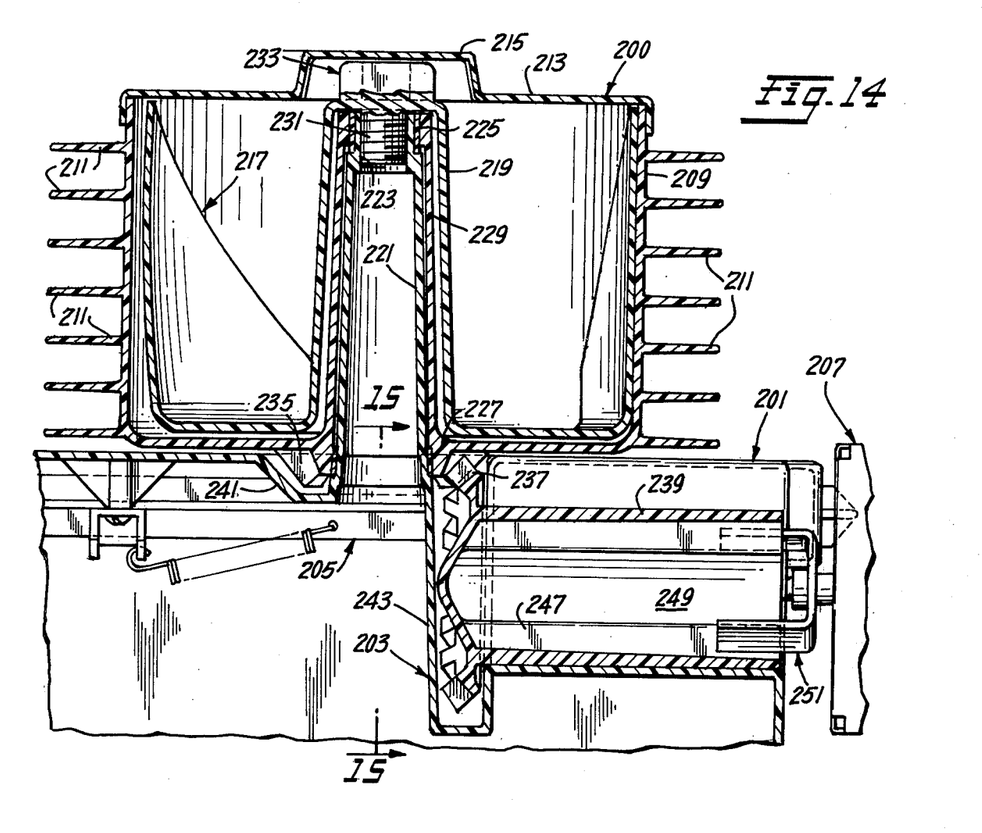
FIG. 14 is a fragmentary vertical sectional view of a second embodiment of an apparatus according to the invention.
Figure 15:
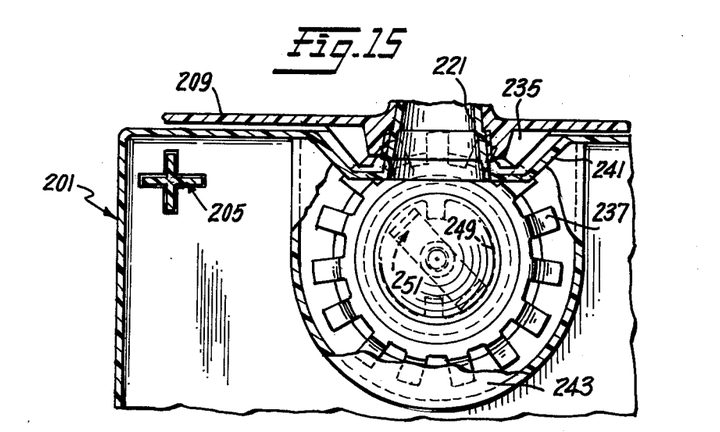
FIG. 15 is a fragmentary vertical sectional view taken on the line 15—15 of FIG. 14.

A second embodiment of the invention shall now be described with reference to FIGS. 14 and 15. An apparatus 200 according to this embodiment includes a casing 201, a drive assembly 203 and a timer assembly 205. For the purpose of this description, timer assembly 205 is exactly the same in structure and function as timer assembly 31. A housing 207 contains a switch assembly (not shown) and a motor (not shown) in the same manner and for the same functions as previously described for the first embodiment.

A housing 209 for containing the mix is detachably secured to casing 201 and includes a plurality of spaced heat exchange fins 211 disposed on its exterior surface. Housing 209 is also provided with a cap 213 having an associated handle 215 for sealing a mix therein during operation of apparatus 200. As in the first embodiment, housing 209 is also of annular configuration and provided with a detachable auger blade 217 which includes a central hollow blade shaft 219. As particularly shown in FIG. 14, casing 201 includes an integral hollow vertical housing 221 which is provided with an internally threaded open end 223. Housing 221 is also provided with an upper journal bearing 225 and a lower journal bearing 227 for contact by the interior surface of a hollow stem 229 that is centrally disposed within and integrally formed with housing 209. Stem 229 is also provided with an open upper end.

It is therefore apparent that assembly of housing 209 onto casing 201 is accomplished by sliding stem 229 over housing 221 until bearings 225 and 227 are in engagement with their corresponding portions of stem 229. Once this has been accomplished, auger blade 217 is assembled by disposing blade housing 219 over stem 229 and securing the former in a stationary manner to housing 221 by disposing a threaded end 231 of a lock nut 233 through an aperture (not shown) provided at the upper end of blade housing 219 and threading end 231 tightly into open end 223 of housing 221. This serves to secure auger blade 217 in a stationary manner relative to casing 201 so that housing 209 may rotate about bearings 225 and 227 relative to auger blade 217.

Rotation of housing 209 is accomplished through drive assembly 203, the latter essentially comprising a first bevel gear 235 carried at the lower end of stem 229 and preferably formed integrally with housing 209, and a second bevel gear 237 carried by a horizontal drive shaft 239, with gears 235 and 237 being disposed in a right angle configuration and engaged upon assembly of housing 209 on casing 201. Gear 235 is enclosed within a first gear housing 241 and gear 237 is enclosed within a second gear housing 243, with housings 241 and 243 being also preferably formed integrally with casing 201. Drive shaft 239 is preferably of a hollow configuration and provided with a pair of internal opposed longitudinal ribs 245 and 247 for defining a socket 249 that is detachably engageable by a drive yoke 251. As is apparent, rotation of drive yoke 251 by a motor (not shown) disposed within housing 207 will cause rotation of drive shaft 239, which in turn transmits this rotary motion to housing 209 through gears 235 and 237. Rotation of housing 209 causes the mix contained therein to be brought into contact with auger blade 217 and is subjected to the same stirring actions previously described for the first embodiment of this invention. Therefore, with the exception of the aforedescribed arrangement, apparatus 200 of this embodiment is of the same structural configuration and operates in the same manner as that previously described for the first embodiment shown in FIGS. 1-13.

Though the embodiments of the invention herein described alternatively depict a mix housing or its associated blade auger as rotating relative to the other about a vertically disposed axis of rotation through a right angle drive assembly, it is also entirely within the purview of this invention to dispose the axis of rotation of either component in a horizontal orientation. This latter configuration shall only require a linear or straight drive assembly wherein the drive yoke directly couples and drives either the auger blade or housing through any appropriate coupling or drive chuck connection well known in the art and deemed suitable for this purpose.

It is preferred to make the housing for containing the mix and its associated heat exchange fins from cast aluminum or any other metal or material having good thermal conductivity characteristics in order to enhance convection heat exchange between the mix contained within the housing and the cold air in the freezer compartment. The casing for containing the drive and timer assemblies is preferably made from any suitable plastic material through injection molding or any other well known manufacturing technique, with its associated components also being preferably integrally molded therewith. Those skilled in the art will immediately recognize the advantage of utilizing various materials and manufacturing techniques for the most efficient and economical manufacturing of the apparatus of the present invention in accordance with the preferred embodiments thereof as described herein.

MODE OF OPERATION

The manner of use and operation of apparatus 17 shall now be described with reference to the first embodiment as shown in FIGS. 1-13. Initially, the user must first remove the existing ice dispenser unit from freezer compartment 3 of refrigerator 1. Auger blade 33 is then disposed within housing 21 so that hollow central section 36 thereof fits over vertical housing 73 of housing 21. An appropriate frozen food mix, such as used in making ice cream or the like, is then placed within housing 21. The latter is then disposed on casing 19 over vertical housing 73 which encloses drive shaft 57. Aligned location of housing 21 on casing 19 is accomplished by disposing arcuate ridges 45 within their corresponding arcuate recesses 43. Housing 21 is secured to casing 19 by attaching knurled knob 35 to threaded end 107 of drive shaft 57. Thereafter, cap 23 is placed on housing 21. The entire apparatus 17, including housing 21, is then inserted into freezer compartment 3 below automatic ice maker 5 in substitution for the existing ice dispenser unit which has been previously removed. When apparatus 17 is fully inserted into compartment 3 in its final operational position, the back end of plunger 49 is disposed through aperture 15 of housing 7, but out of contact with roller 127 of switch assembly 51. Also, drive yoke 13 of drive motor 9 is fully interlocked into recesses 99 of socket 55 for transmitting power from drive shaft 11 of drive motor 9 to drive shaft 53 of drive assembly 29.

To place apparatus 17 into its operational "ON" mode, the user simply rotates timer knob 47 to select the desired period of operation in accordance with the desired physical consistency of the final product. This action immediately reciprocates plunger 49 by cam 91 against roller 127 of switch assembly 51, thereby simultaneously closing bypass switch 131 and opening regular mode switch 133. This immediately places drive motor 9 into cyclical operation, with rotation of its drive shaft 11 being transmitted to drive assembly 29 and auger blade 33. At the same time, the compressor of the refrigerator is placed into continuous operation to assure that the temperature of freezer compartment 3 will remain sufficiently cold to effect adequate convection heat exchange between the mix contained within housing 21 and the cold air of compartment 3. Since the compressor is in continuous operation, the defrost cycle circuit is also inactivated at this time.

When cam 91 of timer assembly 31 places the corresponding end of plunger 49 in dwell recess 95, plunger 49 immediately releases its contact with roller 127 of switch assembly 51, thereby terminating operation of apparatus 17 and placing same in its "OFF" mode. This occurs because bypass switch 131 is opened and normal mode switch 133 is closed, thus placing the refrigerator back into its normal operational mode wherein the defrost cycle is activated and compressor operation is thermostatically controlled. Removal of the frozen product from housing 21 is accomplished by simply sliding apparatus 17 from freezer compartment 3 and reversing the previously described assembly procedure for housing 21.

It is to be understood that the forms of the invention herein shown and described are to be taken as merely preferred examples of the same, and various changes in the shape, size, composition and arrangement of parts may be resorted to by one ordinarily skilled in the art without departing from the spirit of the invention or scope of the subjoined claims.

We claim:

1. An apparatus for making a frozen food product including a refrigerator having a freezer compartment and a removable ice dispenser unit that is driven by the drive shaft of a detachable motor, a frozen food product unit including a housing for containing a food product mix, means disposed within the housing for stirring the mix, and a drive assembly for causing the stirring means to stir the mix, wherein the improvement comprises the frozen food product unit being interchangeable with the ice dispenser unit and including means for detachably connecting the drive assembly to the drive shaft of the detachable motor.

2. The apparatus of claim 1 further including a timer assembly for actuating the detachable motor to operate same for a predetermined period of time.

3. The apparatus of claim 2 further including a casing for containing the drive assembly and the timer assembly.

4. The apparatus of claim 1 wherein the drive assembly is connected to the stirring means for rotating the stirring means by the detachable motor.

5. The apparatus of claim 4 further including cooperating means carried by the housing and the casing for securing the housing against rotation.

6. The apparatus of claim 5 wherein the cooperating means includes a plurality of ridges carried by the bottom of the housing and a plurality of corresponding recesses formed in the upper surface of the casing.

7. The apparatus of claim 1 wherein the drive assembly includes a first drive shaft, a second drive shaft, a right angle bevel gear assembly for transmitting rotary motion from the first drive shaft to the second drive shaft, and the means for detachably connecting the drive assembly to the drive shaft of the detachable motor is carried by the first drive shaft.

8. The apparatus of claim 1 wherein the drive assembly is connected to the housing for rotating the housing by the detachable motor.

9. The apparatus of claim 8 further including means for securing the stirring means against rotation.

10. The apparatus of claim 1 wherein the drive assembly includes a first bevel gear carried by the housing, an assembly drive shaft, a second bevel gear carried by the assembly drive shaft and engageable with the first bevel gear for transmitting rotary motion of the assembly drive shaft to the housing, and the means for detachably connecting the drive assembly to the drive shaft of the detachable motor is carried by the assembly drive shaft.

11. The apparatus of claim 1 wherein the means for detachably connecting the drive assembly to the drive shaft of the detachable motor includes a socket carried by the drive assembly and a yoke carried by the drive shaft of the detachable motor.

12. The apparatus of claim 1 wherein the interior of the housing is of a substantially cylindrical configuration and the stirring means includes an auger blade having a wiping section for laying the food product mix against the interior wall of the housing and a scraping section for removing the food product mix from the interior wall of the housing.

13. The apparatus of claim 1 wherein the exterior surface of the housing is configured for enhancing convection heat exchange between the food product mix contained within the housing and the interior of the freezer compartment.

14. The apparatus of claim 10 wherein the housing is integrally formed of aluminum and includes a plurality of spaced heat exchange fins on the exterior surface thereof.

15. An apparatus for making a frozen food product in the freezer compartment of a refrigerator having an existing ice dispenser unit that is detachable from the drive shaft of a motor for driving same, which apparatus comprises:
(a) a housing for containing a frozen food product mix;
(b) means disposed within the housing for stirring the mix;
(c) a drive assembly for detachably connecting the apparatus to the ice dispenser unit drive motor for stirring the mix by the drive motor; and
(d) a timer assembly for actuating the drive motor to operate same for a predetermined period of time and including:
1. a timer mechanism for establishing a preset period of time,
2. a cam carried by the timing mechanism and rotated by same during the preset period of time,
3. a plunger engageable by the cam, and
4. a switch assembly actuated by the plunger for connecting and disconnecting the ice dispenser unit drive motor to and from a power source.

16. The apparatus of claim 15 further including means for providing cyclical operation of the ice dispenser unit drive motor when the drive motor is connected to the power source.

17. The apparatus of claim 15 further including means for maintaining the main compressor of the refrigerator in continuous operation when the ice dispenser unit drive motor is connected to the power source.

18. The apparatus of claim 15 wherein the switch assembly includes:
(a) a spring arm having one end secured to a stationary support and a free end; and
(b) a roller carried by the free end for engagement by the plunger.

* * * * *